J. M. CASE.
Baking-Ovens.
No. 158,028.
Patented Dec. 22, 1874.
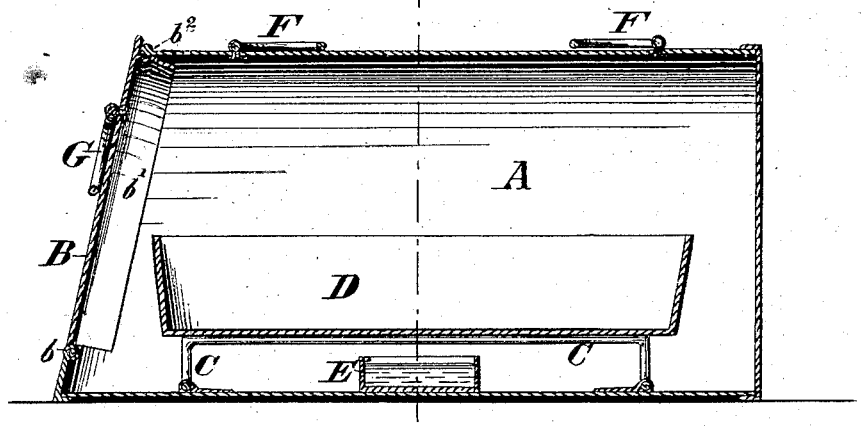
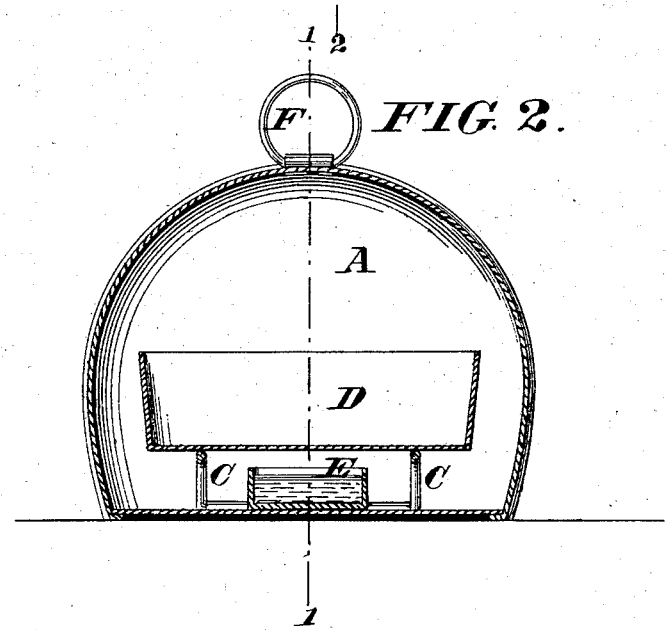
WITNESSES
Walter Allen
W. H. Pearce
INVENTOR
John M. Case
By Knight Bros Attorneys.

UNITED STATES PATENT OFFICE.

JOHN M. CASE, OF ATHENS, OHIO.

IMPROVEMENT IN BAKING-OVENS.

Specification forming part of Letters Patent No. 158,028, dated December 22, 1874; application filed December 12, 1874.

*To all whom it may concern:*

Be it known that I, JOHN M. CASE, of Athens, in the county of Athens and State of Ohio, have invented a new and Improved Baking Apparatus, of which the following is a specification:

My apparatus consists of a horizontal casing fitted with a hinged door at one end, adapted to close substantially air-tight, and when open affording ready access to the interior of the oven, so that a baking-pan may be slid in and out horizontally. The position of the door also enables the inspection of articles in course of being baked or cooked without removing them from the chamber or lifting a cover. In order to support the baking-pan out of contact with the metallic casing, and permit a free circulation of air around it throughout the interior of the chamber, it is made to rest upon rails constructed of stout wire, so that the pan and its contents are entirely surrounded by air and vapor while in course of baking or cooking. The invention further consists in combining with an apparatus consisting, as above described, of an air-tight casing and supporting-rails, on which a baking-pan rests out of contact with the casing, a pan for containing water to produce an additional amount of steam or moisture when required.

In the accompanying drawings, Figure 1 is a longitudinal section of my improved apparatus on the line 1 1, Fig. 2. Fig. 2 is a transverse section on the line 2 2, Fig. 1.

A represents a casing of sheet metal, constructed, preferably, in semi-cylindrical form, with a horizontal bottom and arched sides and top. At one end is a door, B, hinged by its lower straight edge, as shown at $b$, and constructed with a flange, $b'$, so as to fit tightly within the mouth of the casing A. C C are a pair of longitudinal supporting-rails, which are constructed of stout wire or bars, to permit circulation beneath them. Upon these rails the pan or vessel D, to contain bread or other articles to be baked or cooked, rests out of contact with the casing A, so as to be entirely surrounded by air and by the vapors of the bread or other article of food. E represents a pan placed between the rails C C, or in any other convenient position on the bottom of the casing A, for the purpose of containing water, to afford additional moisture for such articles or operations of cooking as may require it, or enable the steaming of any article of food. F F represent handles for lifting and carrying the entire apparatus. G is a handle for opening and closing the door B.

The horizontal position of the casing and the location of its doors at one end, hinged at bottom, as shown, afford very convenient access to the interior of the casing, so that the baking-pan B may be slid in and out horizontally without the necessity of lifting off a cover, and while the cooking operation is progressing it may be readily inspected at any time by simply opening the door. The construction and mode of application of the door render it practically air-tight when closed.

My apparatus thus affords a most convenient, economical, and wholesome means of cooking bread and other articles of food in a uniform and thorough manner without danger of burning.

An essential and important feature in my invention consists in constructing the rails C C in the form of wires or bars, so as to support the baking-pan out of contact with the casing, and at the same time permit the free circulation of air and vapor completely around the articles in course of being cooked. When the supports are constructed in the form of flanges or plates or solid rails, as in some portable and other ovens heretofore devised, such supports so obstruct the circulation of air that an excessive heating of any part of the bottom of the oven is liable to cause unequal baking or cooking of the bread or other article. This result it is an especial object of my invention to avoid.

I am aware that square and oval shaped bake-ovens have been used, and that my fastening device is not new. I do not, therefore, broadly claim such; but What I do claim as new, and desire to secure by Letters Patent, is—

1. In a bake-oven, the combination of the semicircular door B, having a beaded flange, $b'$ $b''$, with the arched horizontal case A, as and for the purpose set forth.

2. In a bake-oven, the combination of the water-pan E with the bake-pan D, supported upon the wires C, to admit of free circulation of air and steam under and around the pan, as and for the purpose set forth.

JOHN M. CASE.

Witnesses:
 OCTAVIUS KNIGHT,
 W. H. PEARCE.